Feb. 26, 1957 — A. ARUTUNOFF — 2,783,400
PROTECTING UNIT FOR OIL-FILLED SUBMERGIBLE ELECTRIC MOTORS
Filed Aug. 5, 1955 — 2 Sheets-Sheet 1

INVENTOR
ARMAIS ARUTUNOFF
ATTORNEY

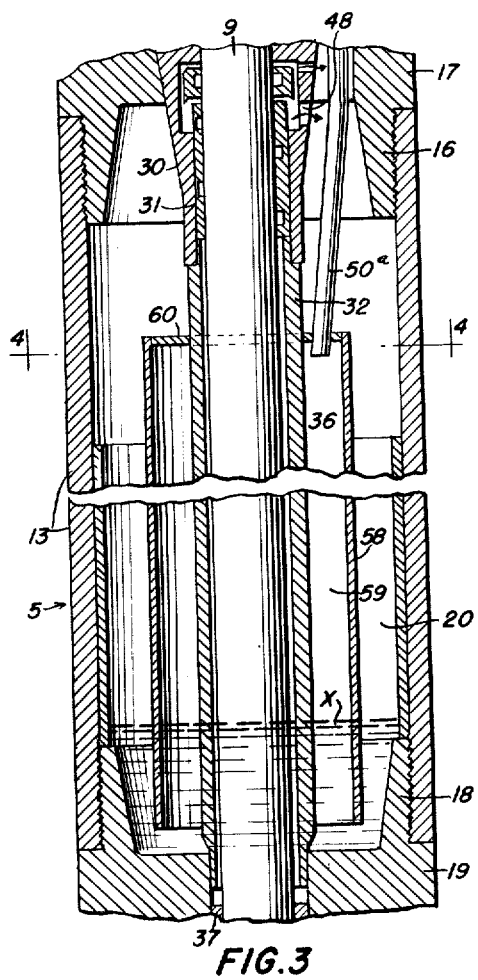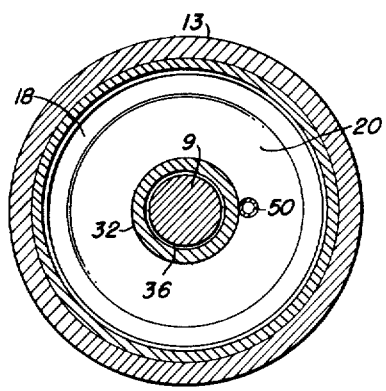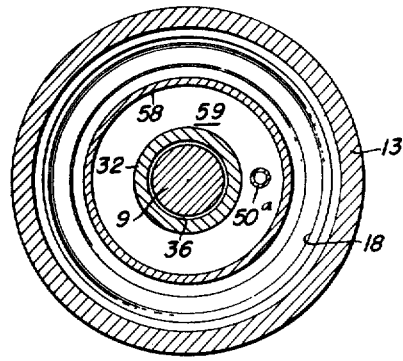

United States Patent Office 2,783,400
Patented Feb. 26, 1957

2,783,400

PROTECTING UNIT FOR OIL-FILLED SUBMERGIBLE ELECTRIC MOTORS

Armais Arutunoff, Bartlesville, Okla., assignor to Reda Pump Company, Bartlesville, Okla., a corporation of Delaware Application August 5, 1955, Serial No. 526,615

5 Claims. (Cl. 310—87)

This invention relates to means for protecting an oil filled submergible electric motor unit for deep well centrifugal pumps and consists more particularly in new and useful improvements in a motor protecting unit adapted to be interposed between a motor and pump unit for protecting said motor against leakage which ordinarily occurs by reason of expansion and contraction of the oil when the motor is started and stopped.

The primary object of the invention is to provide a motor protecting unit adapted to be filled with the lubricating and protecting fluid contained in the motor unit and arranged for intercommunication with the latter, said protecting unit comprising an elongated reservoir divided into two compartments having communicating passageways arranged to substantially double the length of the path traveled by moisture or any contaminating fluid for a given length of reservoir, before such contaminating fluid can reach the pump unit.

Another object of the invention is to provide a protecting unit of this type, wherein the two compartments of the unit are separated by a thrust-bearing chamber arranged in communication with respective compartments and in the path of the lubricating and protecting fluid contained therein.

A further object of the invention is to provide in a protecting unit of this character, an auxiliary protecting chamber for isolating volatile fluids from the body of lubricating and protecting fluid, when the assembly is employed in connection with such fluids as liquefied petroleum gas and the like.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figures 1 and 1A collectively illustrate the complete submergible assembly which is shown in longitudinal section.

Figure 2 is a transverse sectional view taken on line 2—2 of Figure 1.

Figure 3 is a view similar to Figure 1, showing the auxiliary protecting chamber for use with volatile fluids, and Figure 4 is a sectional view taken on line 4—4 of Figure 3.

Figures 1, 1A:
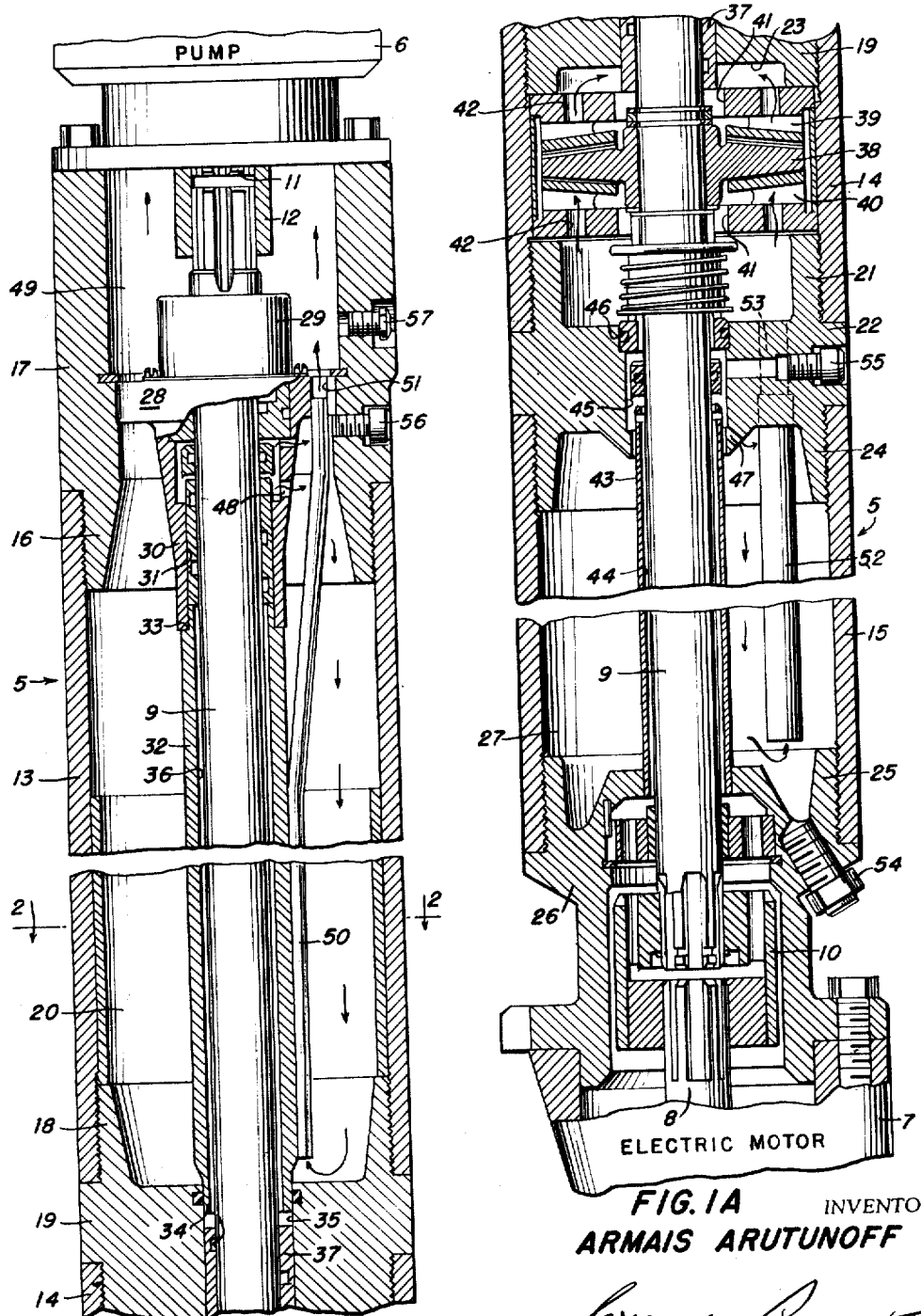

In the drawings, referring first to Figures 1 and 1A, 5 generally represents the protecting unit which is interposed between concentric pump and electric motor units 6 and 7, respectively. The motor unit is of the vertical type, including a vertical shaft 8, splined at its upper end for connection to the splined lower end of a shaft section 9 extending axially through the protecting unit 5. Any suitable means such as the coupling 10 may be employed for connecting the shaft 8 and shaft section 9.

The upper end of the shaft section 9 is similarly splined for connection to the splined lower end of the pump shaft 11 by means of a suitable coupling 12.

The protecting unit 5 is in the form of an elongated, cylindrical housing comprising a series of concentric sections 13, 14 and 15. The upper section 13 is internally threaded at both extremities for connection to the reduced threaded end 16 of a head 17 and the upstanding, annular threaded flange 18 of a transverse partition member 19 which forms the base of an upper protecting fluid compartment 20, as will later appear.

The intermediate housing section 14, which is relatively short, is similarly threaded at both extremities for engagement with the reduced and threaded body portion of the partition 19 and an upstanding threaded annular flange 21 on a second partition 22, spaced vertically from the first partition 19. These spaced partitions form the vertical limits of a thrust-bearing chamber 23 bounded peripherally by the intermediate shaft section 14, a more detailed description of this thrust-bearing and chamber being covered at a later point.

The lower partition 22 carries an annular threaded flange 24, which engages complementary threads in the upper end of the lower housing section 15, the lower extremity of said section 15 being threaded to engage in a vertical annular threaded flange 25 on the base member 26 of the protecting unit. Thus, the lower section 15, together with the partition 22 and the base member 26, form a second compartment 27, coaxial with the upper compartment 20 and the intermediate thrust-bearing compartment 23.

The upper end of the compartment 20 is closed by an annular body 28 which fits closely within the bore of the head 17 and centrally supports a suitable bearing and seal structure 29 which embraces the upper end of the shaft 9. A bushing member 30 depends from the body 28 around the shaft 9 and is provided internally with a spirally grooved liner 31. Extending between the lower end of the bushing 30 and the first partition 19, is a tubular sleeve section 32 which is reduced at its opposite extremities as at 33 and 34, for insertion within the bushing 30 and a central opening 35 in the partition 19. The sleeve 32 surrounds the shaft 9 with sufficient clearance to provide an annular fluid passageway 36 along the shaft. The opening 35 carries a spirally grooved bushing or liner 37 which embraces the shaft 9 immediately above and communicating with the thrust-bearing chamber 23.

Within the bearing chamber 23, the shaft 9 carries a radially extending thrust runner 38 which is interposed between a pair of annular thrust-bearing members 39 and 40 secured to the casing section 14. This thrust-bearing assembly is substantially of the type known as the Kingsbury or Mitchell thrust-bearing, wherein the radially extending runner 38 is wedge-shaped in cross-section and engages complementary surfaces on the bearing members 39 and 40 whereby, when the chamber 23 is filled with oil or protecting fluid, a substantially wedge-shaped film of oil lies between the engaging surfaces of the runner and bearing members. The bearing members 39 and 40 are centrally apertured as at 41 and intermediate their radial extremities, are ported as at 42 to facilitate the free passage of fluid from end to end of the chamber 23.

A second sleeve member 43 surrounds the lower portion of the shaft 9 within the lower compartment 27 and extends between the partition 22 and the base member 26, as shown in Figure 1A. As in the case of the first sleeve member 32, the sleeve 43 is spaced from the shaft 9 to provide an annular passageway 44 which places the bore of the head 26 in communication with a central recess in partition 22, designated as 45, the latter being sealed around the shaft as at 46 so that passage of oil along the shaft is stopped at this point. The recess 45 communicates with the upper end of the compartment 27 through a port 47 whereby, expanding oil from the motor 7 flows through the annular passageway 44 within the sleeve 43 and first enters the compartment 27 through the port 47, as will later appear in the discussion of the operation of this assembly.

Returning to the compartment 20, it will be seen in Figure 1 that the depending bushing 30 attached to the closure head 28, is provided with radial ports 48, whereby fluid from the bearing chamber 23, passing along the spiral groove in bushing 37 and upwardly through the annular clearance 36 along the shaft 9 and the spiral grooves in the bushing line 31, is conducted into the compartment 20.

The lower end of each of the compartments 20 and 27 is placed in communication with the chamber immediately above, by a depending tube. Thus, the compartment 20 communicates with the coupling chamber 49 which leads to the pump 6, by a tube 50, the lower open end of which terminates adjacent the bottom of compartment 20 with its upper end projecting through an opening 51 in the closure body 28 which leads into the coupling compartment 49. Similarly, the compartment 27 communicates with the thrust-bearing chamber 23 by means of a tube 52 depending from an opening 53 in partition 22 and terminating in an open end adjacent the bottom of compartment 27.

A drain and fill valve 54 is provided in the base member 26 for filling the protecting unit with protecting and lubricating fluid and suitable vent valves 55 and 56 are provided in the partition 22 and head 17, respectively, to permit the escape of air from the compartments 20 and 27 during the filling operation. A relief valve 57 may be provided in the head 17 above the closure body 28.

Before the motor and pump assembly is installed in a well, the motor housing is filled with lubricating and protecting fluid and a similar fluid fills the compartments 20 and 27, all of which are in communication through the means described above. As the motor 7 runs during the pumping operation, a certain degree of heat develops which naturally causes an expansion of the oil in the motor. This expanding oil travels upwardly along the shaft 9 from the motor unit, through the annular passageway 44 formed by the sleeve 43 and enters compartment 27 through port 47. From compartment 27 the oil travels upwardly from the lower end thereof through tube 52 and into the thrust bearing chamber 23, from whence it travels upwardly through the spiral groove in bushing 37 and enters the lower end of the annular clearance 36 provided by sleeve 32 in compartment 20. The oil then enters compartment 20 through ports 48 in bushing 30 and from the lower end of compartment 20 the oil travels upwardly through tube 50 and into the coupling chamber 49 which communicates through the lower end of the pump unit, with the surrounding well fluid.

When a motor is stopped, the gradual cooling of the oil and protecting fluid in the assembly tends to contract, causing a suction to develop at the upper end of the protecting unit 5, drawing the surrounding well fluid into the unit. By reversing the course of travel just described, it will be seen that any fluid drawn into the unit enters through the opening 51 in the closure head 28 and travels downwardly through tube 50 to the bottom of the compartment 20. Any particles of sediment and heavier fluids which would contaminate the protecting fluid in the unit, settle at the bottom of compartment 20, while the protecting fluid thereabove, enters the ports 48 in bushing 30 and travels downwardly through the spiral groove in line 31, through the annular clearance 36 and spirally grooved bushing 37, into the thrust-bearing chamber 23. From the chamber 23 the protecting fluid travels downwardly through tube 52 to the bottom of compartment 27 where again any objectionable particles or fluids are collected in the bottom of the compartment. The lighter protecting fluids in the compartment 27 are forced through port 47 and chamber 45 into the clearance 44 and back to the motor unit 7.

It will thus be seen that by dividing the elongated protecting unit 5 into two compartments and providing the alternating passageways just described, the length of the path traveled by moisture or any contaminating fluid is substantially increased for a given length of reservoir space.

When the assembly is used in the pumping of liquefied petroleum gas and other volatile fluids, it is desirable to employ an auxiliary protecting chamber in the form of a cylinder 58 which is located in the compartment 20 surrounding the shaft 9 and sleeve 32. This cylinder 58 is open at its lower extremity adjacent the bottom of compartment 20 and provides an annular chamber 59 closed at its upper end by a closure disk 60. A short tube 50a replaces the tube 50 and extends downwardly only a slight distance in the chamber 59, through an opening in the disk 60, all as shown in Figure 3.

With this modified form of the invention, the path traveled by the fluid both during expansion and contraction thereof, is the same as that just described. However, on contraction of the fluid, any of the volatile surrounding fluid which may be drawn into the unit is controlled by a water seal in the bottom of compartment 20. As seen in Figure 3, water is introduced into the compartment 20, as shown in dotted lines at X, which represents a volume substantially equal to the maximum expansion of oil by the heat of the running motor. Thus, with the proper volume of water sealing the lower end of the auxiliary cylinder 58, any volatile fluid drawn into the chamber 59 through tube 50a, simply forces the water in the chamber 59 to a lower level and correspondingly raises the level of the water surrounding the sleeve 58. This forces the protecting fluid above the raised water level, through the ports 48 and downwardly through sleeve 32 as previously described. The reverse occurs during the expansion of oil, when the level of the water in compartment 20, surrounding the cylinder 58 lowers, raising the level within the chamber 59. In other words, the water seal simply fluctuates during expansion and contraction of the protecting and lubricating fluid within the unit and acts as a seal between the volatile fluid being pumped and the protecting fluid within the unit.

From the foregoing it is believed that the invention may be readily understood by those skilled in the art, without further description, it being borne in mind that numerous changes may be made in the details disclosed, without departing from the spirit of the invention as set forth in the following claims.

I claim:

1. A protecting unit for oil-filled submergible, electric motors, comprising a cylindrical casing adapted to be interposed between a vertical electric motor and a superimposed, coaxial pump, a motor shaft extension projecting coaxially through said casing for connecting the motor shaft to the pump shaft, vertically separated upper and lower, annular fluid receiving reservoirs in said casing, closed at their longitudinal extremities, said reservoirs being peripherally bounded by said casing and inwardly bounded by respective, longitudinally extending, concentric sleeve members, said sleeve members surrounding said shaft extension in radially spaced relation, to form upper and lower, annular fluid passageways, respectively separated from each other and the surrounding reservoirs, the lower end of the lower passageway communicating with the interior of said motor and its upper end with the top of said lower reservoir, an unobstructed tube communicating with the lower end of said upper passageway, depending in said lower reservoir and connecting said upper passageway with the latter, the upper end of said upper passageway communicating with the upper end of said upper reservoir, and an unobstructed vertical tube in said upper reservoir placing the lower end of the latter in communication with the exterior of said casing at a point above said unit but below the intake of said pump, whereby the path of fluid traveling along said shaft extension in either direction, upon expansion or contraction of the fluid in said motor, is multiplied a plurality of times the length of each reservoir.

2. A protecting unit for oil-filled submergible, electric motors comprising a cylindrical casing adapted to be interposed between a vertical electric motor and a superimposed, coaxial pump, a motor shaft extension projecting coaxially through said casing for connecting the motor shaft to the pump shaft, coaxial upper and lower, annular fluid receiving reservoirs in said casing, closed at their longitudinal extremities and vertically separated by an intervening coaxial thrust-bearing chamber, a thrust-bearing assembly for the intermediate portion of said shaft extension, located in said chamber, said reservoirs being peripherally bounded by said casing and inwardly bounded by respective, longitudinally extending, concentric sleeve members, said sleeve members surrounding said shaft extension in radially spaced relation, to form upper and lower, annular fluid passageways, respectively separated from each other and the surrounding reservoirs, the lower end of the lower passageway communicating with the interior of said motor and its upper end with the top of said lower reservoir, means connecting the lower end of said upper passageway with the upper end of said thrust-bearing chamber, an unobstructed tube communicating with the lower end of said thrust-bearing chamber, depending in said lower reservoir, the upper end of said upper passageway communicating with the upper end of said upper reservoir, and an unobstructed vertical tube in said upper reservoir placing the lower end of the latter in communication with the exterior of said casing at a point above said unit but below the intake of said pump, whereby the path of fluid traveling along said shaft extension in either direction, upon expansion or contraction of the fluid in said motor, is multiplied by a plurality of times the length of each reservoir.

3. A protecting unit for oil-filled submergible, electric motors, comprising a cylindrical casing adapted to be interposed between a vertical electric motor and a superimposed, coaxial pump, a motor shaft extension projecting coaxially through said casing for connecting the motor shaft to the pump shaft, vertically separated upper and lower, annular fluid receiving reservoirs in said casing, closed at their longitudinal extremities, said reservoirs being peripherally bounded by said casing and inwardly bounded by respective, longitudinally extending, concentric sleeve members, said sleeve members surrounding said shaft extension in radially spaced relation, to form upper and lower, annular fluid passageways, respectively separated from each other and the surrounding reservoirs, the lower end of the lower passageway communicating with the interior of said motor and its upper end with the top of said lower reservoir, an unobstructed conduit connecting the lower end of said upper passageway with the lower end of said lower reservoir, the upper end of said upper passageway communicating with the upper end of said upper reservoir, an unobstructed conduit connecting the lower end of said upper reservoir with the exterior of said casing at a point above said unit but below the intake of said pump, and a water seal in the bottom of said upper reservoir, surrounding the entrance end of said last named conduit, whereby the path of fluid traveling along said shaft extension in either direction, upon expansion or contraction of the fluid in said motor, is multiplied a plurality of times the length of each reservoir, and any volatile fluid entering said upper reservoir from the exterior, is trapped therein.

4. A protecting unit as claimed 3, wherein said water seal, comprises an auxiliary protecting cylinder, surrounding said upper sleeve member in spaced relation, said cylinder being closed at its upper end with its lower end open and immersed in a column of water in the bottom of said upper reservoir, said last named conduit placing the closed upper end of said cylinder in communication with the exterior of said casing above said unit.

5. A protecting unit for oil-filled submergible, electric motors, comprising a cylindrical casing adapted to be interposed between a vertical electric motor and a superimposed, coaxial pump, a motor shaft extension projecting coaxially through said casing for connecting the motor shaft to the pump shaft, means dividing said casing into upper and lower fluid receiving reservoirs and an intervening coaxial thrust-bearing chamber, a thrust-bearing assembly in said chamber for the intermediate portion of said shaft extension, annular fluid passageways, extending through the upper and lower reservoirs, around the shaft extension, and respectively placing the upper portion of the upper reservoir in communication with the intervening thrust-bearing chamber and the upper portion of the lower reservoir in communication with the motor, and separate unobstructed conduits respectively connecting the pump with the lower portion of said upper reservoir and said thrust-bearing chamber with the lower portion of said lower reservoir, whereby the path of fluid traveling along said shaft extension in either direction, upon expansion or contraction of the fluid in said motor, is multiplied a plurality of times the length of each reservoir.

References Cited in the file of this patent

UNITED STATES PATENTS

| | | |
|---|---|---|
| 1,701,468 | Arutunoff | Feb. 5, 1929 |
| 1,855,274 | Arutunoff | Apr. 26, 1932 |

FOREIGN PATENTS

| | | |
|---|---|---|
| 431,886 | Great Britain | July 17, 1935 |

Dedication 2,783,400.—*Armais Arutunoff*, Bartlesville, Okla. PROTECTING UNIT FOR OIL-FILLED SUBMERGIBLE ELECTRIC MOTORS. Patent dated Feb. 26, 1957. Dedication filed June 23, 1966, by the assignee, *Byron Jackson Pumps, Inc.*

Hereby dedicates to the Public the remaining term of said patent.
[*Official Gazette September 13, 1966.*]